United States Patent [19]

Yamamoto

[11] Patent Number: 4,683,536
[45] Date of Patent: Jul. 28, 1987

[54] PRODUCT SALES DATA PROCESSING SYSTEM FOR ON-LINE CONNECTION TO HOST CPU

[75] Inventor: Mikio Yamamoto, Shizuoka, Japan

[73] Assignee: Tokyo Electric Co., Ltd., Tokyo, Japan

[21] Appl. No.: 760,294

[22] Filed: Jul. 29, 1985

[30] Foreign Application Priority Data

Aug. 8, 1984 [JP] Japan ................... 59-166249

[51] Int. Cl.⁴ .................................................. G06F 15/30
[52] U.S. Cl. ...................................... 364/408; 364/405; 364/406; 235/380
[58] Field of Search .............. 364/401, 405–408, 364/200 MS File, 900 MS File; 235/379–380, 381, 382, 382.5

[56] References Cited

U.S. PATENT DOCUMENTS

| | | | |
|---|---|---|---|
| 3,719,927 | 3/1973 | Michels et al. | 364/406 X |
| 4,025,760 | 5/1977 | Trenkamp | 364/408 X |
| 4,319,326 | 3/1982 | Uchida | 364/405 |
| 4,321,672 | 3/1982 | Braun et al. | 364/408 |
| 4,386,266 | 5/1983 | Chesarek | 235/380 |
| 4,485,300 | 11/1984 | Peirce | 235/380 |
| 4,558,211 | 12/1985 | Berstein | 235/380 |
| 4,569,421 | 2/1986 | Sanstedt | 364/401 X |
| 4,594,663 | 6/1986 | Nagata et al. | 364/401 |
| 4,594,664 | 6/1986 | Hashimoto | 364/405 |

Primary Examiner—Gary V. Harkcom
Attorney, Agent, or Firm—Frishauf, Holtz, Goodman & Woodward

[57] ABSTRACT

A product sales data processing system includes a plurality of interconnected credit authorization terminals for performing the transmission and reception of data with an outside host computer. One of the credit authorization terminals receives the sales data from the other credit authorization terminals and sequentially transmits these sales data over an outside line to the host computer.

2 Claims, 10 Drawing Figures

PRODUCT SALES DATA PROCESSING SYSTEM FOR ON-LINE CONNECTION TO HOST CPU

BACKGROUND OF THE INVENTION

The present invention relates to a product sales data processing system using a plurality of credit authorization terminals.

A product sales data processing system provided with a plurality of credit authorization terminals (CATs) connected to a host computer is generally known. In the known product sales data processing system, however, even when a plurality of credit authorization terminals are provided, these credit authorization terminals are merely coupled, individually, to a host computer through telephone lines so a to exchange information with the host computer; information cannot be directly exchanged among these credit authorization terminals. In addition, none of the credit authorization terminals has the function whereby it can exchange information with a point of sales (POS) terminal to register and process product sales data.

Consequently, in such a conventional product sales data processing system, it is necessary to install the same number of telephone lines as credit authorization terminals, resulting in expensive and troublesome drawbacks caused by construction expenses, telephone circuit rental fees and the like, making this system very uneconomical. Moreover, in the case where the price of the product, registered in the POS terminal, is paid by credit, the drawback arises wherein it is necessary to key-input the registered amount of money in the credit authorization terminal, thereby creating the potential for making a mistake in the key-input process.

SUMMARY OF THE INVENTION

It is an object of the present invention to provide a product sales data processing system in which the number of telephone lines is reduced and the transaction data registered in a POS terminal can be automatically processed.

This object is accomplished by a product sales data processing system comprising a plurality of POS terminals for registering sales data of products; a plurality of slave credit authorization terminals, each including a card reading circuit to read a credit card number from the credit card set at the reading position; and input unit to input the sales data of the products and the personal identification number; a POS interface which is selectively connected to one of those POS terminals; a CAT interface and a data transfer control unit to control the data transfer to these POS and CAT interfaces; and a master credit authorization terminal having a card reading circuit to read the circuit card number from the credit card set at the reading position, an input unit to input the sales data of the products and the personal identification number, a POS interface selectively connected to one of those POS terminals, a CAT interface connected to the CAT interfaces of those plurality of slave credit authorization terminals, a host interface connected to an external computer and a data transfer control unit to control the data transfer to the POS, CAT and host interfaces, wherein each of the data transfer control units of the plurality of slave credit authorization terminals produces the authorization data on the basis of the sales data from either the POS terminal or the input unit, the card data from the card reading circuit, and the personal identification number from the input unit, and then supplies this authorization data to the master credit authorization terminal where the data transfer control unit sequentially transfers the authorization data from the plurality of slave credit authorization terminals to an external computer through the host interface.

In this invention, master and slave credit authorization terminals are used. All of the authorization data from the slave credit authorization terminals are transferred to the external host computer through the master credit authorization terminal, so that it is sufficient to install only one telephone line between this master credit authorization terminal and the host computer, thereby making this system very economical. Further, the sales data processed in the POS terminal is automatically transferred to one of the master and slave credit authorization terminals to which the POS terminal is connected, obviating the need to input this sales data to one of the master and slave credit authorization terminals by way of a key operation.

DETAILED DESCRIPTION OF THE PREFERRED EMBODIMENT

A product sales data processing system according to one embodiment of the present invention will now be described with reference to the drawings.

Figure 1:
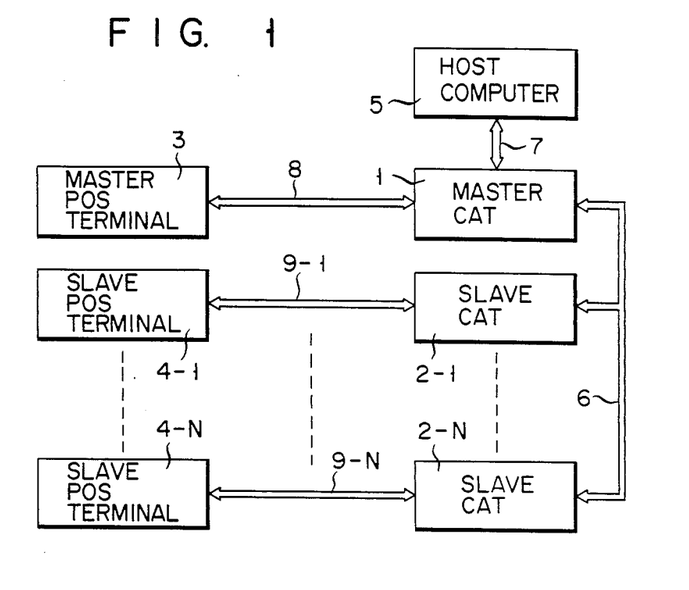
FIG. 1 is a block diagram of a product sales data processing system according to one embodiment of the present invention.

The product sales data processing system shown in FIG. 1 includes a master CAT 1, slave CATs 2-1 to 2-N, a master POS terminal 3, slave POS terminals 4-1 to 4-N and a host computer 5. The master CAT 1 and the respective slave CATs 2-1 to 2-N are electrically connected by an inline circuit 6. The master CAT 1 and the host computer 5 are electrically connected by an online circuit 7 including a telephone line such as a public line, a dedicated line or the like. The master CAT 1 and the master POS terminal 3 are electrically connected by an interface cable 8. The slave CATs 2-1 to 2-N, and the slave POS terminals 4-1 to 4-N are electrically connected by interface cables 9-1 to 9-N, respectively.

Figure 2:
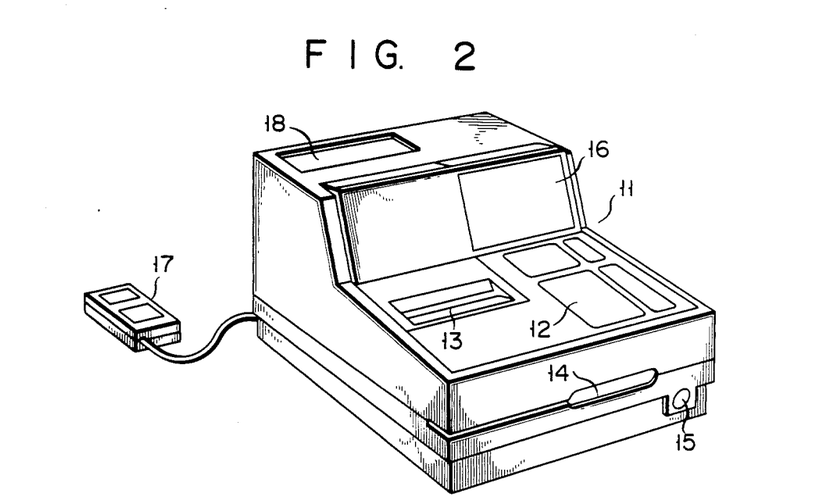
FIGS. 2 and 3 are perspective views of a credit authorization terminal for use in the sales data processing system shown in FIG. 1, as seen from the front and rear positions of this terminal, respectively.
Figure 3:
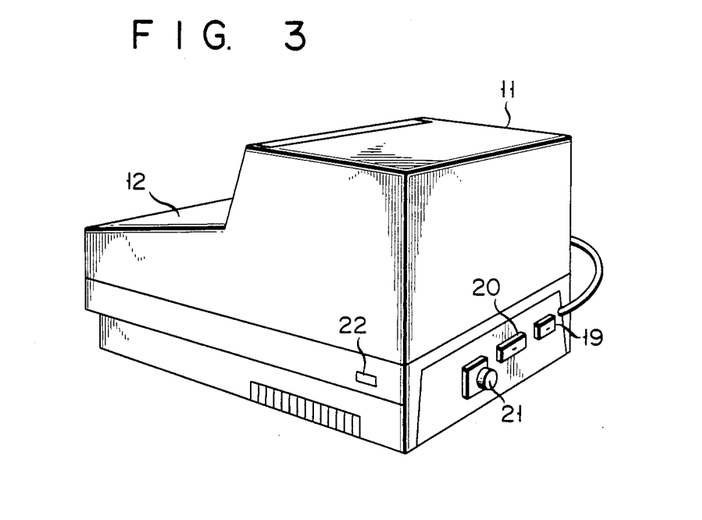

As shown in FIGS. 2 and 3, in each of the foregoing CATs 1 and 2-1 to 2-N, a keyboard 12 and a receipt issuing outlet 13 are provided in the central portion of the front surface of a main body casing 11, a credit card inserting port 14 and a control switch 15 are provided in the lower portion of the front surface, and a display 16 is provided in the upper portion of the front surface. The keyboard 12 is provided with numeral keys to input product sales data or the like, and function keys to perform the credit process and the like. The control switch 15 is a key switch to designate various kinds of work such as registration work, program work, reset work, etc. A pin pad device 17, to input a secret number, is connected to the CAT main body. When the pin pad device 17 is not used, it can be enclosed in a pin pad enclosing portion 18 provided in the top of the casing 11. A connector 19, to which the interface cables 8 and 9-1 to 9-N are connected; a connector 20, to which the online circuit 7 is connected; and a connector 21, to which the inline circuit 6 is connected, are provided in the lower portion of the rear surface of the casing 11. A power switch 22 is provided in the lower portion of the side surface of the casing 11.

Figure 4:
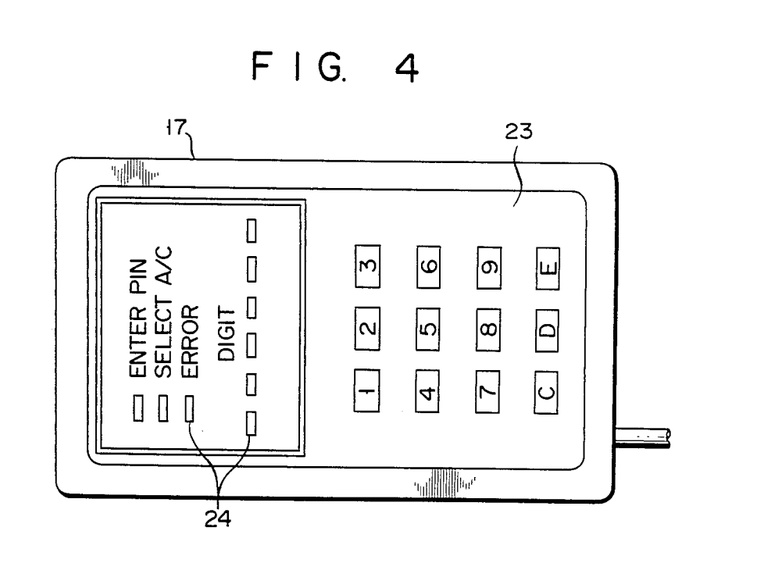
FIG. 4 is a top plan view of a pin pad device which is used for the credit authorization terminal shown in FIGS. 2 and 3.

As shown in FIG. 4, the pin pad device 17 is provided with a keyboard 23 to input a secret number, and an LED display 24 to display a state in which a personal identification number (PIN) need be written, a state in which either cash or a credit card is selected as the means of transaction, an error state and a state indicative of the digit position of a numeral to be written next.

Figure 5:
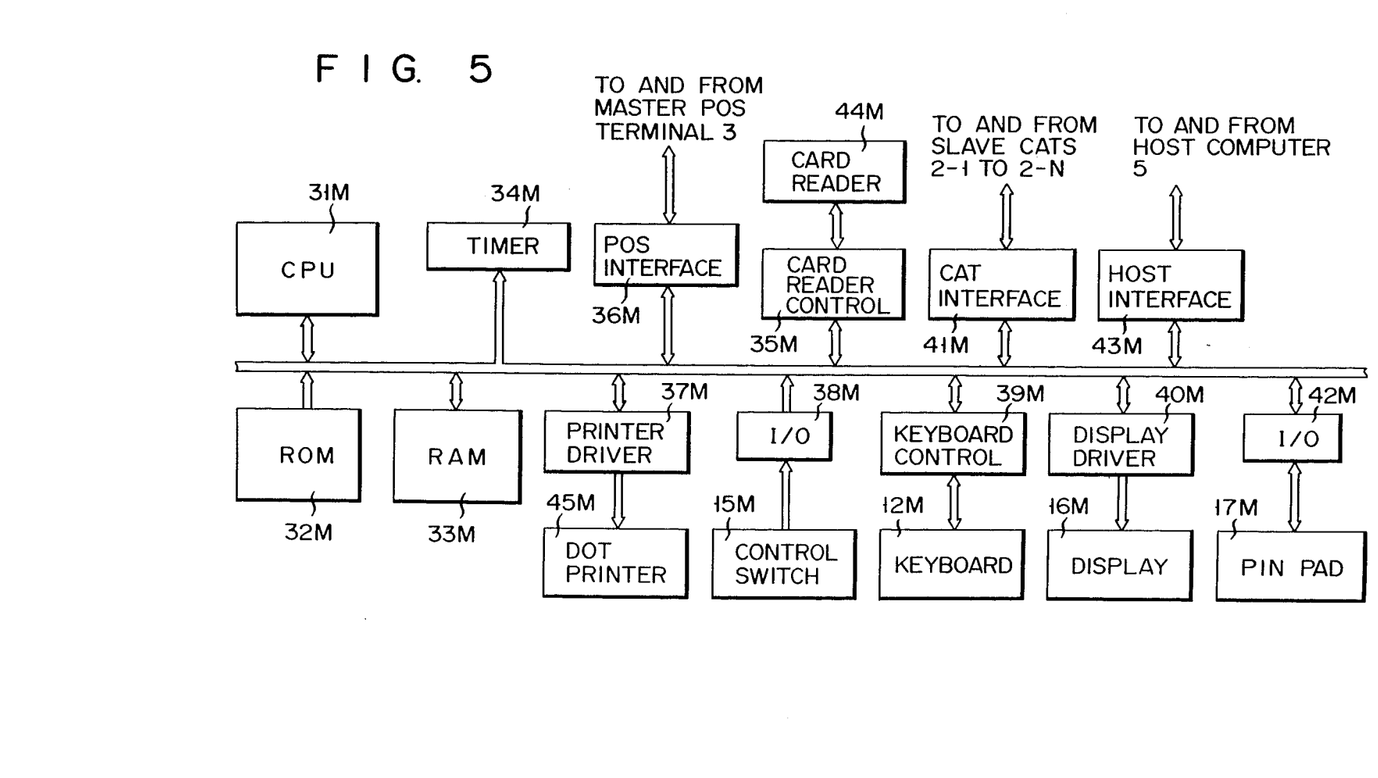
FIGS. 5 and 6 are block diagrams of master and slave credit authorization terminals, respectively, for use in the sales data processing system shown in FIG. 1.

FIG. 5 is a block diagram showing a circuit arrangement of the master CAT 1. The master CAT 1 comprises a central processing unit (CPU) 31M, a read only memory (ROM) 32M, a random access memory (RAM) 33M, a timer circuit 34M to count the date, a card reader control 35M, a POS interface 36M, a printer driver 37M, an input port 38M, a keyboard control 39M, a display control 40M, a CAT interface 41M, an input/output (I/O) port 42M, and a host interface 43M. A card reader 44M provided near the inside of the credit card inserting port 14 is connected to the card reader control 35M. A dot printer 45M provided near the inside of the receipt issuing outlet 13 is connected to the printer driver 37M. A control switch 15M is connected to the input port 38M. A keyboard 12M is connected to the keyboard control 39M. A display 16M is connected to the display control 40M. The pin pad device 17M is connected to the I/O port 42M. Further, the CAT interface 41M is connected to the slave CATs 2-1 to 2-N. The host interface 43M is connected to the host computer 5. The POS interface 36M serves to exchange information with the master POS terminal 3 through the interface cable 8 which is connected to the connector 19. The CAT interface 41M serves to exchange information with the slave CATs 2-1 to 2-N through the inline circuit 6 which is connected to the connector 21. The host interface 43M serves to exchange information with the host computer 5 through the online circuit 7 which is connected to the connector 20.

Figure 6:
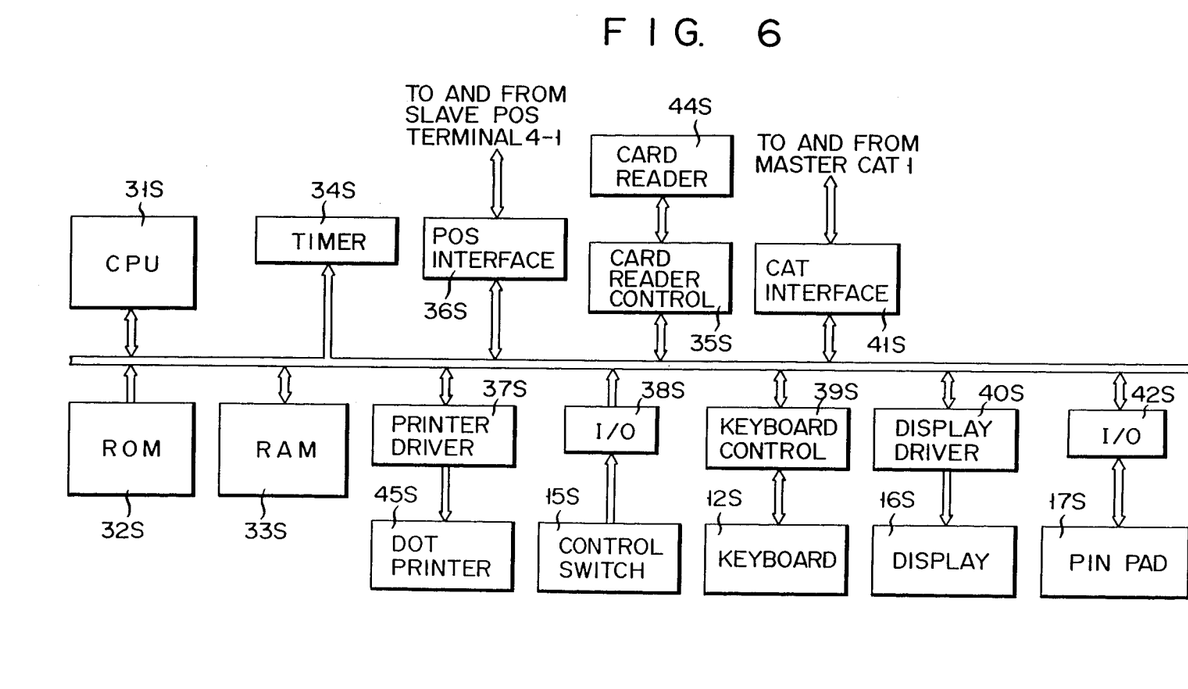

FIG. 6 is a block diagram showing a circuit arrangement of the slave CAT 2-1. The other slave CATs are also constituted in a similar manner as the slave CAT 2-1. The slave CAT 2-1 is constituted in substantially the same manner as the master CAT shown in FIG. 5, except that the circuit section corresponding to the host interface 43M is not provided. In the slave CAT 2-1, a POS interface 36S serves to exchange information with the slave POS terminal 4-1 through the interface cable 9-1. A CAT interface 41S serves to exchange information with the other CATs through the inline circuit 6.

Figure 7:
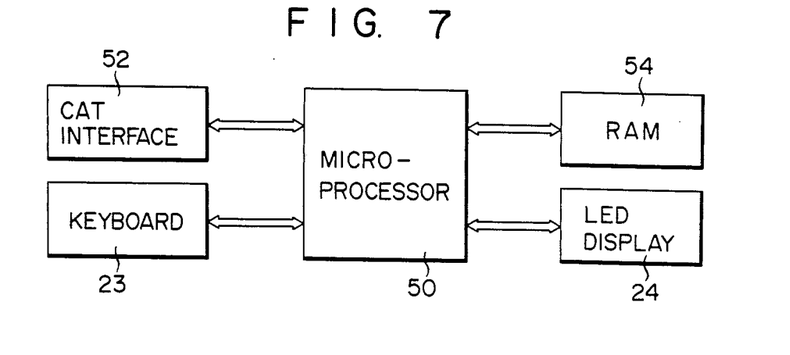
FIG. 7 is a block diagram of the pin pad device shown in FIG. 4.

As shown in FIG. 7, the pin pad device 17 is constituted by a microprocessor 50 including a ROM and various kinds of I/O ports, a CAT interface 52, a RAM 54, and the keyboard 23 and LED display 24 which are connected to the microprocessor 50. The CAT interface 52 is connected to the I/O port 42M or 42S of the master or slave CAT, and serves to exchange information with the CPU 31M or 31S of the master or slave CAT.

Figure 8:
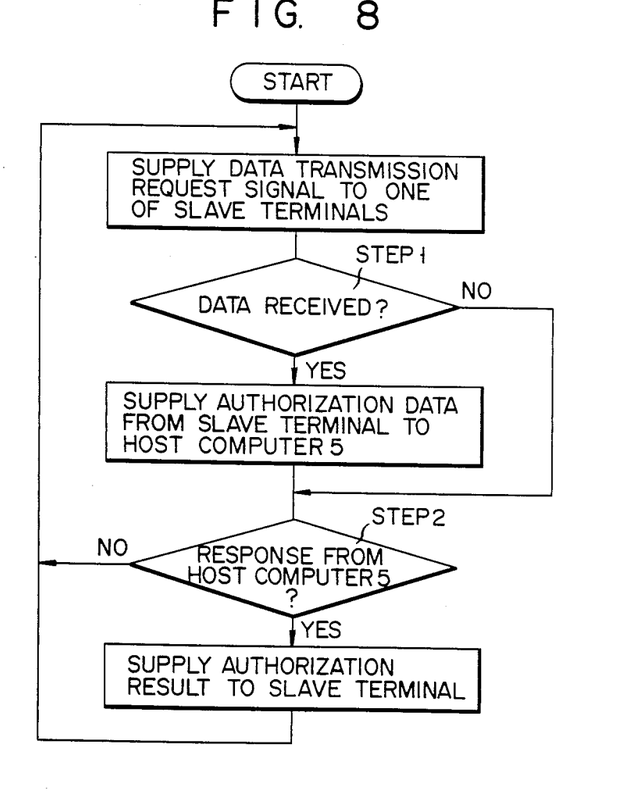
FIG. 8 is a flowchart for explaining the operation of the master credit authorization terminal shown in FIG. 5.

The CPU 31M of the master CAT 1 controls the data transfer on the basis of the program data in the ROM 32M, and, in particular, performs a control such as shown in FIG. 8. Practically speaking, the CPU 31M sequentially generates a data transmission request signal to slave CATs 2-1 to 2-N. In STEP 1, when it is detected that the authorization data was received from one of the slave terminals 2-1 to 2-N in response to the data transmission request signal, the CPU 31M sends this received authorization data to the host computer 5. In STEP 2, it waits for a response from the host computer 5. The host computer 5 reads out, from the memory provided in the host computer, the registered PIN data, remainder data of the credit card and the like, and, on the basis of the card data included in the input authorization data, checks to see both if the key-inputted PIN data coincides with the registered PIN data or not, and if the amount of money involved in the transaction and represented by the input sales data is smaller than the remainder data or not. Then, the host computer 5 sends the authorization result corresponding to the results of these checks to the master credit authorization terminal 1. For instance, if it is detected that the input PIN does not coincide with the registered PIN, or that an insufficient amount of money is left on the credit card at the time of the transaction, the authorization result indicating that this transaction is invalid is sent to the master CAT 1. When the CPU 31M receives the response indicative of the authorization result from the host computer 5, the CPU 31M returns the authorization result to one of the slave terminals 2-1 to 2-N from which it was generated. Conversely, if the response indicative of the authorization result is not transmitted from the host computer 5, even after the expiration of a predetermined time, the CPU 31M supplies the data transmission request signal to next one of the slave terminals 2-1 to 2-N and executes an operation similar to the above. In the case where the answer is "NO" in STEP 1, STEP 2 is executed.

When the master CAT 1 receives data from the master POS terminal 3, the authorization data is produced on the basis of the input data and sent to the host computer 5. Thereafter, the authorization result from the host computer 5 is sent to the master POS terminal 3 in a manner similar to that mentioned above.

Figure 9:
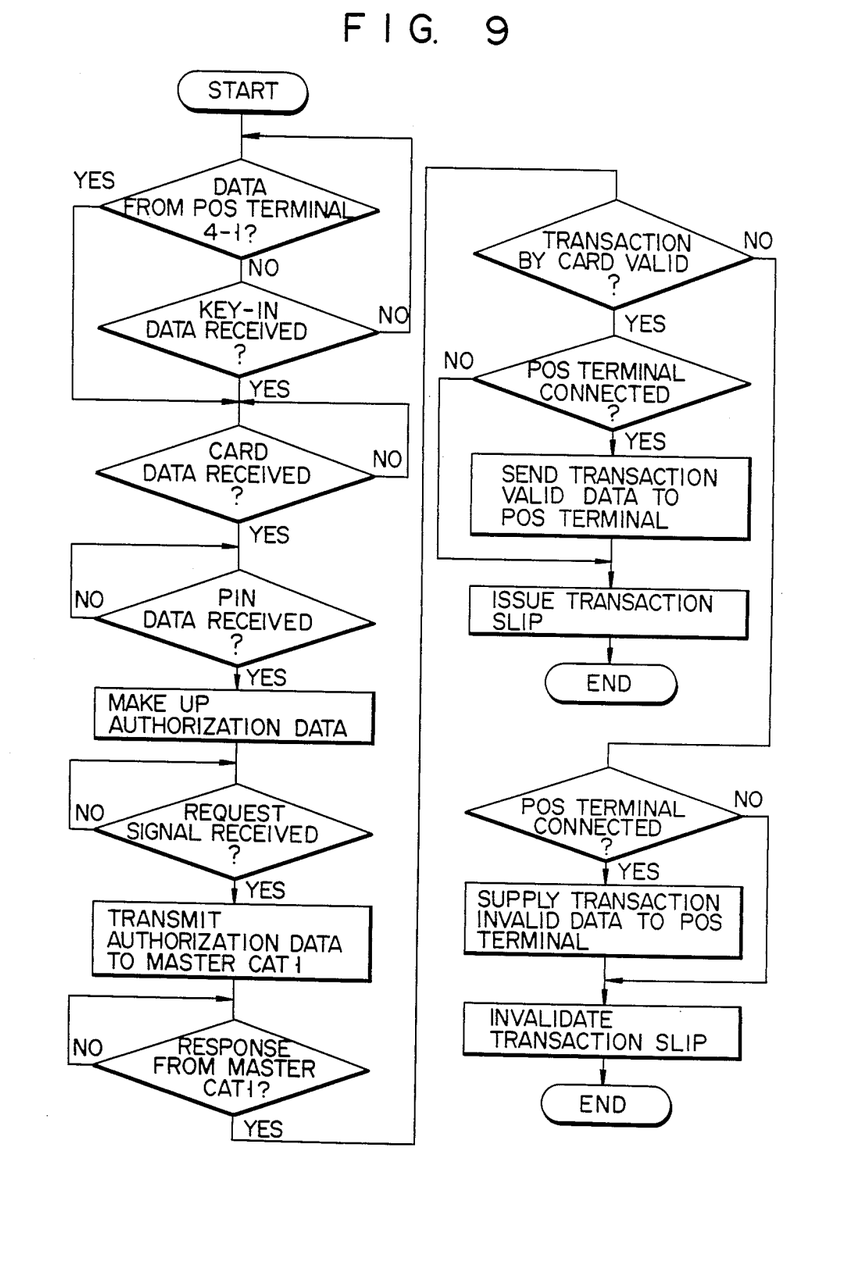
FIG. 9 is a flowchart for explaining the operation of the slave credit authorization terminal shown in FIG. 6.

FIG. 9 is a flowchart for explaining the operation of the slave CAT 2-1. The other slave CATs also operate in a fashion similar to the slave CAT 2-1. Initially, when data such as sales data or the like is inputted from the POS terminal 4-1, or when a key-in data corresponding to the sales data or the like is inputted from a keyboard 12S, a CPU 31S of the slave CAT 2-1 checks to see if both the card data and the personal identification number (PIN) from a pin pad device 17S were inputted or not. When it is detected that the card data, including both the credit card number and the PIN data, were inputted, the CPU 31S produces the authorization data on the basis of input data such as sales data, card data, PIN data and the like. Thereafter, the CPU 31S supplies the produced authorization data to the master CAT 1 in response to the data transmission request signal from the master CAT 1. The CPU 31S then waits for the response from the master CAT 1. When the CPU 31S receives the response data regarding the authorization result from the master CAT 1, the CPU 31S checks to see if the current transaction on a particular card is valid or not on the basis of the authorization result. After that, a check is made to see if the POS terminal is connected to the POS interface 36S or not. In the case where both the transaction is valid and the POS terminal is connected to the POS interface 36S, the CPU 31S supplies the transaction valid data to the POS terminal and then issues a transaction slip. When, however, the transaction is valid and the POS terminal is not coupled to the POS interface 36S, the transaction slip is immediately issued. In the case where a current transaction using a credit card is invalid, the transaction slip too is invalidated. If the POS terminal is connected to the POS interface 36S, the transaction invalid data is supplied to the POS terminal.

Figure 10:
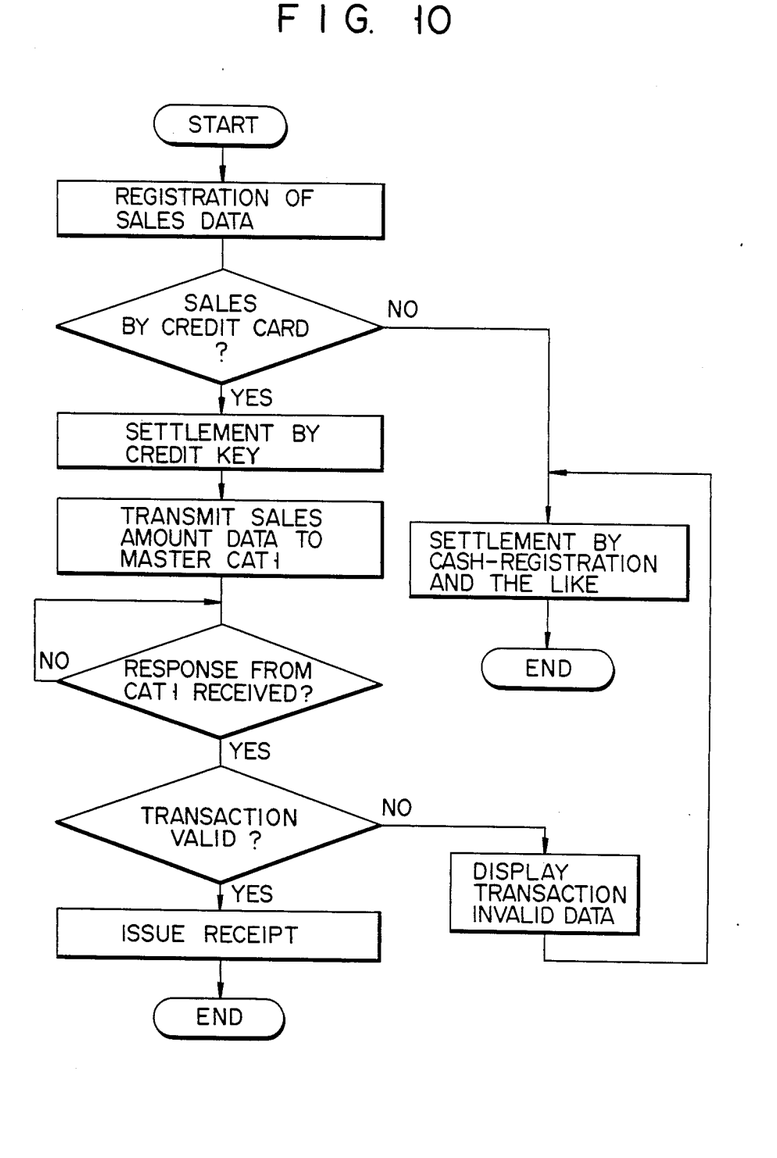
FIG. 10 is a flowchart for explaining the operation of the POS terminal for use in the sales data processing system shown in FIG. 1.

FIG. 10 is a flowchart for explaining the operation of the master POS terminal 3. The operations of the slave POS terminals 4-1 to 4-N are substantially similar to the operation of the master POS terminal 3.

First, the registration of the sales product is executed in response to the key operation. Next, a check, is made to see if this sales product has been paid by credit card or not. If it was paid by credit card, the credit key is operated to effect a settlement execution. Thereafter, the total sales amount data and card data are transmitted to the master CAT 1, and the system waits for the response from the master CAT 1. In accordance with the response from the master CAT 1, a check is made to see if the card transaction is valid or not. When it is detected that the card transaction is valid, the sales data is printed on the receipt and the receipt is then issued. In contrast, when it is determined that the card transaction is invalid, the transaction invalid data indicating that the transaction is invalid is displayed, and, thereafter, a settlement, by way of cash-registration or the like, is executed. If it is decided that the current transaction is not to be performed by credit card, settlement on the basis of cash-registration or the like is executed.

As described above, in the product sales data processing system shown in FIGS. 1 to 6, one master CAT 1 and N slave CATs 2-1 to 2-N are used. However, since all of the authorization data from the slave CATs 2-1 to 2-N are transmitted to the host computer 5 through the master CAT 1, it is sufficient to use only one circuit as the online circuit, such as a telephone line wired between the master CAT 1 and the host computer 5. Therefore, the wiring construction is simplified, reducing construction expenses, while, similarly, the rental fee of the circuit is reduced, resulting in both economy and improved efficiency.

In addition, since the data from the respective POS terminals 3 and 4-1 to 4-N are transmitted through the interface cables 8 and 9-1 to 9-N to the master CAT 1 and respective slave CATs 2-1 to 2-N, there is no risk that an error involving the amount of money data will ensue from inaccurate operation of the keys.

In the event that the POS terminal is not connected in each CAT, the product sales data is input from the keyboard 12M or 12S, similar to the conventional manner.

Although the present invention has been described above with respect to one embodiment, the invention is not limited to only this embodiment. For instance, although the POS terminals 3 and 4-1 to 4-N are coupled to the credit authorization terminals 1 and 2-1 to 2-N, respectively, connection of the POS terminals to all of the credit authorization terminals is not always necessary.

What is claimed is:

1. A product sales data processing system, comprising:
    a plurality of point of sales (POS) terminals including a master POS terminal and a number of slaves POS terminals for registering sales data of products by transferring said sales data to an external host computer for registration;
    a plurality of slave credit authorization terminals (CATs), each including first card reading means for reading a credit card number from a credit card set at a reading position, a first working memory area, first data input means for inputting sales data of products and a personal identification number into said first working memory area, a slave POS interface arranged for connection to a respective one of said slave POS terminals, a slave CAT interface, and first data transfer control means for controlling data transfer to said slave POS and said slave CAT interfaces; and
    a master credit authorization terminal including second card reading means for reading the credit card number from the credit card set at a reading position, a second working memory area, second data input means for inputting sales data of products and a personal identification number, a master POS interface arranged for connection to said master POS terminal, a master CAT interface arranged for connection to the CAT interfaces of said plurality of slave credit authorization terminals, inline circuit means for connecting said master CAT interface to each of said slave CAT interfaces, a host interface arranged for connection to said external host computer, online circuit means for connecting said host interface to said host computer, and second data transfer control means for controlling data transfer to said master POS, master CAT and host interfaces,
    wherein each of said first data transfer control means of said plurality of slave credit authorization terminals produces authorization data on the basis of the sales data from either said respective slave POS terminal or said first data input means, the card data from said first card reading means and the personal identification number from said first data input means, and then supplies said authorization data to said master credit authorization terminal,
    the second data transfer control means of said master credit authorization terminal sequentially transferring the authorization data from said plurality of slave credit authorization terminals to the external host computer through said host interface.

2. A system according to claim 1, wherein said first and said second data input means of said master and slave credit authorization terminals comprises keyboard means and a personal identification number pad means.

* * * * *